March 10, 1942.       J. T. MARVIN ET AL       2,275,538
LUBRICATING SYSTEM
Original Filed Jan. 28, 1938       2 Sheets—Sheet 1
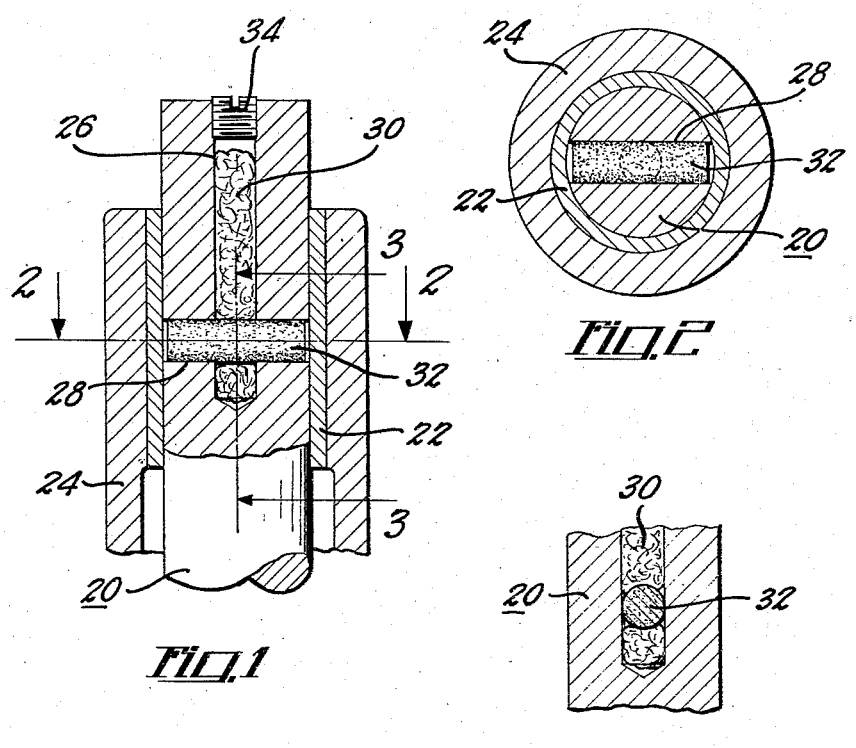
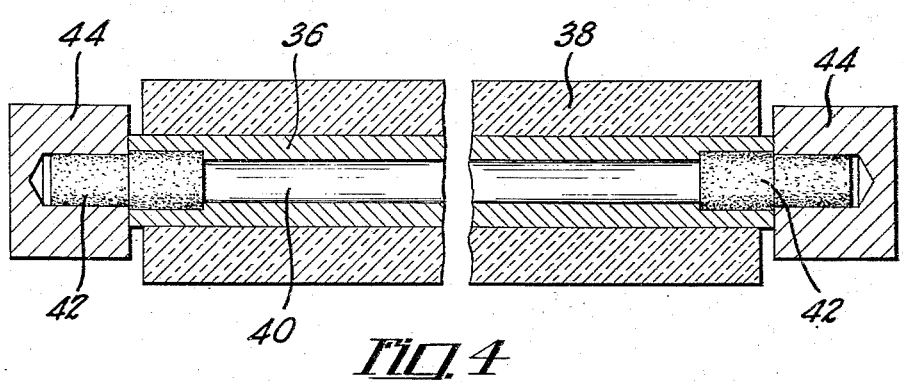
INVENTORS
John T. Marvin
Earl S. Patch
by Spencer Hardman & Feher
Their ATTORNEYS March 10, 1942.  J. T. MARVIN ET AL  2,275,538
LUBRICATING SYSTEM
Original Filed Jan. 28, 1938  2 Sheets-Sheet 2

INVENTORS
John T. Marvin
Earl S. Patch
by Spencer Hardman & Fehr
their ATTORNEYS Patented Mar. 10, 1942

2,275,538

UNITED STATES PATENT OFFICE 2,275,538

LUBRICATING SYSTEM

John T. Marvin and Earl S. Patch, Dayton, Ohio, assignors to General Motors Corporation, Detroit, Mich., a corporation of Delaware Original application January 28, 1938, Serial No. 187,380. Divided and this application August 7, 1940, Serial No. 351,702

6 Claims. (Cl. 308—78)

This application is a division of application Serial No. 187,380, filed January 28, 1938.

The present invention relates to lubricating systems for shafts and their journals and more particularly to lubricating systems in which an oil reservoir is carried within the shaft.

One of the objects of the present invention is to provide a lubricating system for a bearing journal of a shaft, which shaft has an oil reservoir therein, and which includes at least a portion of porous metal that communicates with said reservoir, for conveying lubricant from the reservoir to the bearing surface.

It is a further object of the invention to provide a lubricating system for a bearing which has a shaft journaled therein, an oil reservoir being provided for the shaft and extending axially therein, and a porous metal plug disposed transversely of said reservoir and within said shaft, said plug conveying lubricant from the reservoir to the bearing surface.

It is a further object to provide a lubricating system for a shaft and bearing, in which a lubricant reservoir is carried within the shaft, said shaft including portions of porous metal which communicate with the reservoir through which the oil seeps to the bearing surface and thereby lubricates the bearing surface.

Further objects and advantages of the present invention will be apparent from the following description, reference being had to the accompanying drawings wherein preferred embodiments of the present invention are clearly shown.

In the drawings:

Fig. 1 illustrates one form of the present invention in which the shaft is vertically disposed.

Fig. 2 is a view taken on the line 2—2 of Fig. 1.

Fig. 3 is a view taken on line 3—3 of Fig. 1.

Fig. 4 illustrates another embodiment of the present invention as applied to a wringer roll construction.

Figure 5:
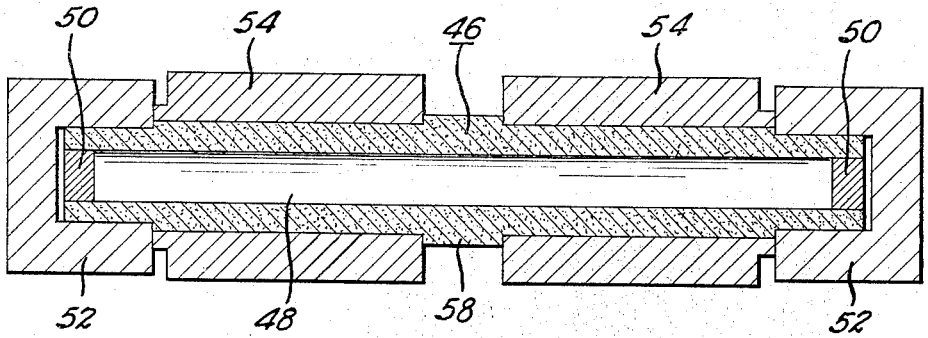
Fig. 5 illustrates still another embodiment of the present invention as applied to top roll construction of a textile machine and, Fig. 6 shows a modification of the construction illustrated in Fig. 1, as applied to a wringer roll.

Self-lubricated bushings have been used successfully for a number of years and usually include a porous bronze bushing having an oil reservoir associated with the bushing for providing lubricant thereto which is fed through the bushing by capillarity to the bearing surface, such a construction is shown in the patent to Patch 1,873,146. Usually bushings of this character are impregnated with lubricant prior to their disposal within the bushing support and the oil from the reservoir merely replenishes such impregnated lubricant as the same is supplied to the bearing surface.

The present invention is particularly directed to lubrication of bushings, wherein due to the physical application of the bushing there is not sufficient space to provide an oil reservoir therefor, or, where due to the specific application, it is not desirable to have an oil reservoir which is externally located. Such applications are found in combination with washing machines, wringers on washing machines, top roll construction in textile machines etc. In each of these applications the use of an external oil reservoir is impractical due to the lack of space around the bushing. It should be understood there are many other applications other than those hereinbefore mentioned wherein oil reservoirs disposed around the bushings are impractical and in connection with which the present invention could be successfully utilized.

Referring to the drawings, Fig. 1 illustrates a vertically disposed shaft 20 journalled in the bushing 22 which is carried by a housing 24, such an assembly being commonly used in present day washing machines in connection with the agitator shafts. Bushing 22 may be formed from porous bronze material, babbitt or the usual cast bronze material. The shaft 20 is bored axially thereof as at 26 and transversely thereof as at 28 to provide an oil reservoir 30 and a passage through which a plug 32 may be pressed. Plug 32 is made from some porous metal material preferably porous bronze and communicates both with the reservoir 30 and the bearing surface 22. The reservoir 30 may be filled with oil which is fed by capillarity within the minute, intercommunicating pores of the porous metal plug 32 to the bearing surface. This oil flow is metered inasmuch as when sufficient oil is present at the bearing surface, the surface tension effect thereof tends to prevent further feeding of oil through the plug to the bearing surface. Thus the bearing 22 is adequately lubricated for long periods of time since the oil flow through plug 32 is very minute and the oil supply in reservoir 30 is sufficient to maintain the lubrication of the bearing surfaces for long periods often approximating the life of the machine. A plug 34 is provided as a closure for the end of the reservoir and is put in place after the reservoir is charged with lubricant.

Fig. 4 illustrates another embodiment of the present invention as applied, for illustrative purposes, to a wringer roll. In this embodiment a shaft 36 of non-porous material is provided as a support for a rubber bolster or roll 38. The shaft is bored axially thereof to form an oil reservoir 40 therethrough. Both ends of the reservoir 40 are closed by porous metal stub shafts 42 which are pressed into the bore within shaft 36. Prior to the assembly of the stub shafts 42, the reservoir 40 is charged with lubricant. The two stub shafts 42 are journaled in supports 44 disposed at either end of the wringer roll. In the present application lubricant seeps through the stub shafts 42 and lubricates the bearing journals of said shafts. This present embodiment is especially desirable in wringer rolls since excessive use of oil on wringer bearings is to be avoided. By the present invention the wringer roll is lubricated for life and at no time is an excess of oil present. Particular advantage over an externally lubricated bearing is apparent since it eliminates the necessity of periodic lubrication and thereby prevents any possibility of oil being accidentally spilled on the wringer roll.

Fig. 5 illustrates a common construction used in connection with top rolls of textile machines. In such machinery it is highly desirable to provide only such lubrication as will prevent binding or excessive wear of the rolls. This is necessary since in textile machinery there is much lint suspended in the atmosphere and any oily part of the machine quickly accumulates the lint and thereby causes binding of the part. Furthermore, if the rolls are not permanently lubricated it is necessary to periodically oil the same which not only necessitate much labor but which is practically impossible to accomplish without leaving an oil film at the external parts of the machine, which film will collect lint.

According to the present invention a shaft 46 for carrying the top rolls may be formed of metal such as porous bronze. The shaft 46 is drilled axially thereof to provide an oil reservoir 48 therethrough. The ends of the reservoir 48 are closed by suitable closures 50 after the reservoir has been filled with oil. Two end supports 52 are provided for holding the ends of the shaft in position. The rolls 54 are journaled on the shaft 46 and are maintained in spaced relation by a shaft shoulder 58. The rolls 54 rotate on the shaft 46 and are adequately lubricated by the capillary feeding of oil through the shaft. As previously explained just sufficient oil is fed to the bearing surfaces to provide adequate lubrication and no excess oil seeps out of the ends of the bearing surfaces due to the surface tension effect thereof.

Figure 6:
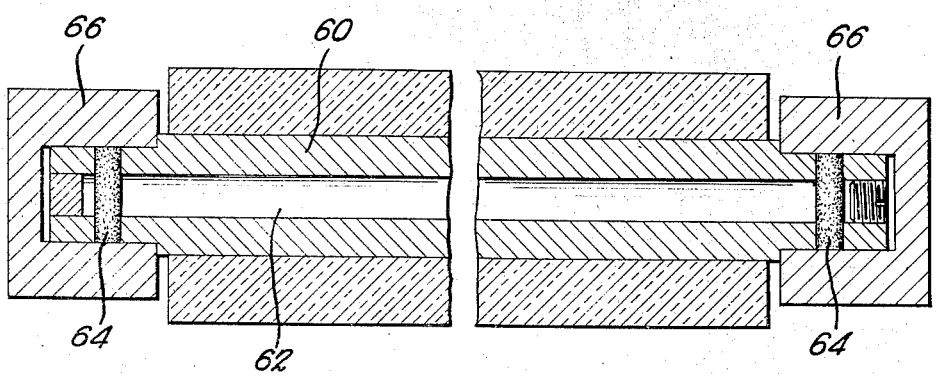

Fig. 6 shows a modification of the embodiment shown in Fig. 1, as applied to a wringer roll. In this instance the central shaft 60 includes a reservoir 62 therethrough. Two porous metal plugs 64 passing through the reservoir 62 convey the lubricant from reservoir to the bearing surfaces of bushings 66. Obviously a similar construction could be utilized in connection with the top rolls in which a non-porous shaft could be utilized having an oil reservoir therein with a plurality of porous metal plugs communicating therewith. The plugs would terminate with their outer ends adjacent the bearing surfaces.

In all the aforementioned embodiments some absorbent material such as waste, wicking etc. may be loosely packed in the reservoir to act as a distributing means for the oil. This is especially desirable when the shaft which contains the reservoir is horizontally disposed and stationary since it aids in supplying oil to the upper surfaces after the oil supply becomes slightly depleted.

In the embodiments wherein porous metal oil conveying plugs are utilized, the plugs may be disposed in either of two manners. Fig. 6 shows the porous metal plugs so disposed as to form a part of the bearing surface of the shaft. Porous metal plugs as fabricated from bronze forming powders, iron, nickel, or monel forming powders etc., have a high mechanical strength and, therefore, can easily carry a portion of the bearing load as imposed on the bearing surface of the shaft. The proportion of load on the ends of the plug is determined by the relative areas of porous metal and non-porous shaft surface at the bearing surface of the shaft. Fig. 1 shows another type of installation wherein the plug terminates a spaced distance from the bearing surface of the shaft. Such a disposition of the plug provides a small oil reservoir adjacent the bearing surface and is desirable in connection with shafts that rotate at high rates of speed since the small reservoir adjacent the bearing surface supplies additional lubricant upon starting of the machine.

It is therefore apparent that we have provided a self-lubricated shaft for use in many types of installations wherein periodic oiling is not desired or is impossible. Likewise, the present invention is advantageous in certain applications where due to design characteristics thereof external oil reservoirs around the bushing journals is impracticable.

While the embodiments of the present invention as herein disclosed, constitute preferred forms, it is to be understood that other forms might be adopted, all coming within the scope of the claims which follow.

What is claimed is as follows:

1. In a lubricating system for a bearing, a shaft made from a non-porous material, an oil reservoir extending axially of the shaft, porous metal stub shafts pressed into each end of said oil reservoir and extending beyond the ends of the shaft, said porous metal stub shafts thereby closing the oil reservoir, two bushings suitably supported and disposed at each end of the shaft, said bushings thereby being lubricated by lubricant conveyed from said reservoir through said stub shafts.

2. In a lubricating system, a porous metal shaft, an oil reservoir extending axially within said shaft, a roll journaled on said shaft and relatively rotatable with respect thereto, the bearing surface between said roll and said shaft being lubricated by oil from said reservoir which is conveyed to said bearing surface by the capillary action within the intercommunicating pores of said porous metal shaft.

3. A self-lubricated shaft assembly comprising in combination a shaft at least a portion of which is porous metal, an oil reservoir within the shaft and extending axially thereof, a bearing for said shaft, said porous metal portion rotatably fitted within said bearing for forming the entire bearing support therein, said porous metal portion communicating directly with said oil reservoir.

4. A self-lubricated shaft assembly comprising in combination a shaft including an oil reservoir therein extending axially thereof, a bearing for said shaft, the portion of the shaft extending into said bearing being porous metal and being in communication with said reservoir whereby oil from the reservoir seeps into the porous metal and by capillarity lubricates the bearing journal.

5. A self-lubricated shaft assembly comprising the combination; a shaft formed of porous metal throughout the entire length thereof and having an oil reservoir therein extending axially of the shaft, a roll journalled upon the shaft and relatively rotatable with respect thereto, the bearing surface between said roll and said shaft being lubricated by oil which is adapted to be placed in said reservoir and which is adapted to be conveyed to said bearing surface by capillarity within the pores of the porous metal shaft, and means for supporting the shaft.

6. A self-lubricated shaft assembly comprising; a shaft having at least the entire bearing portion thereof completely formed from porous metal, an oil reservoir extending axially of the shaft, said reservoir being adapted to hold a lubricant and communicating with said porous metal bearing portion whereby oil contained in said reservoir is fed to the bearing portion of the shaft by capillarity within the inter-communicating pores of the porous metal portion.

JOHN T. MARVIN.
EARL S. PATCH.